Nov. 29, 1966 — W. J. FORTUNE — 3,287,808
CLAMP SAW GUIDE
Filed Sept. 15, 1964 — 2 Sheets-Sheet 1
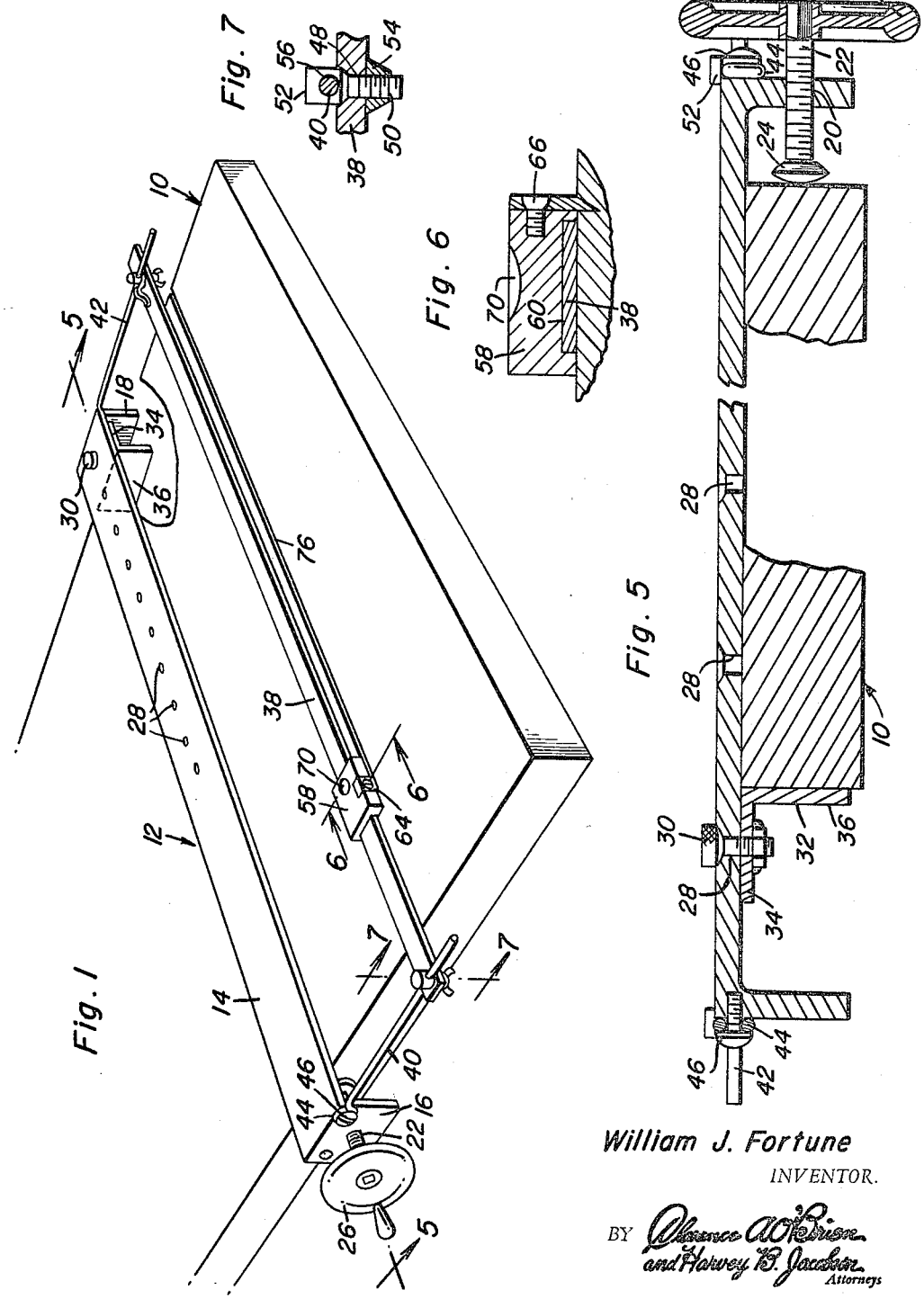
William J. Fortune
INVENTOR.

Nov. 29, 1966  W. J. FORTUNE  3,287,808
CLAMP SAW GUIDE
Filed Sept. 15, 1964  2 Sheets-Sheet 2
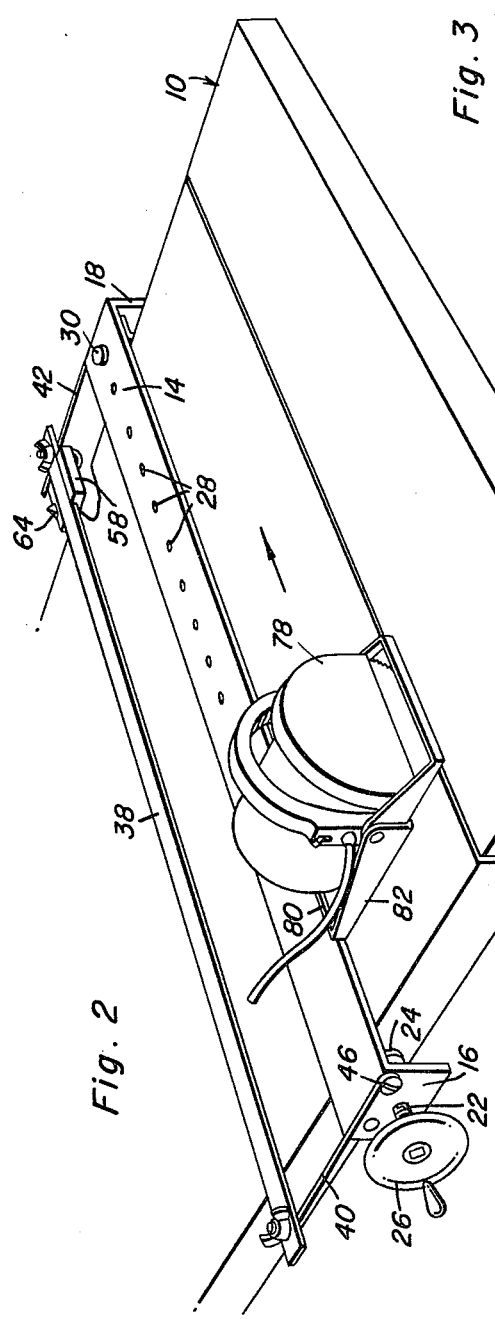
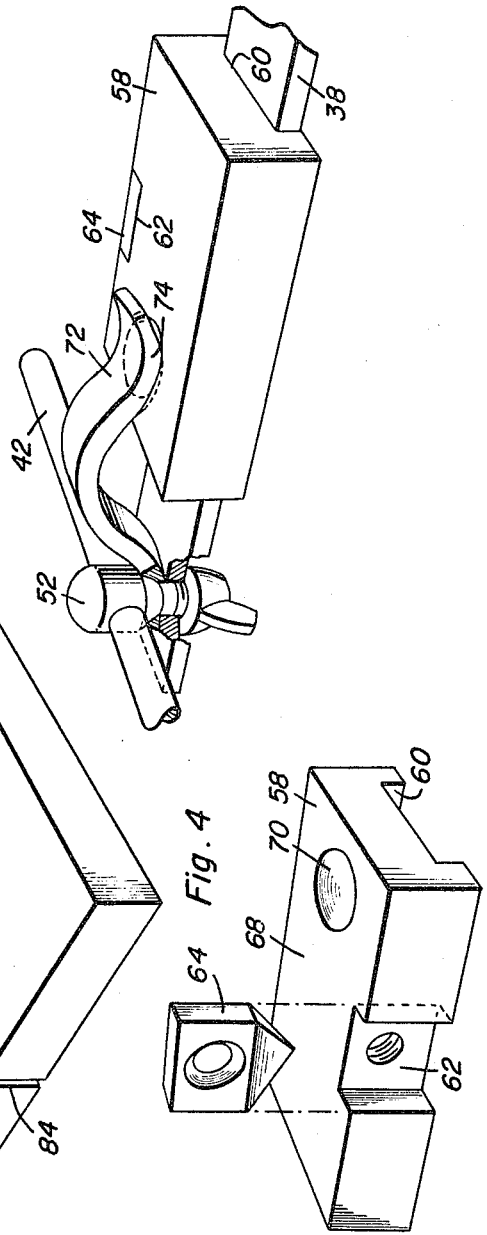
William J. Fortune
INVENTOR.

United States Patent Office 3,287,808
Patented Nov. 29, 1966

3,287,808
CLAMP SAW GUIDE
William J. Fortune, 946 South 5th West,
Missoula, Mont.
Filed Sept. 15, 1964, Ser. No. 396,580
8 Claims. (Cl. 33—32)

This invention relates to a novel and useful clamp-type saw guide adapted to be clampingly engaged with a workpiece and including an elongated guide member extending transversely of the workpiece and an elongated secondary guide supported from the guide member for swinging movement of the secondary guide about an axis generally paralleling the guide member from a first operative position disposed on one side of and generally paralleling the guide member and a second inoperative position disposed to the other side of the guide member.

By utilizing this basic structure a portable circular saw may be slidably engaged with the guide member and moved longitudinally of the latter as the circular saw cuts the workpiece, the cut formed by the circular saw coinciding with a mark formed on the workpiece by means of a marking member carried by the secondary guide and slidable longitudinally therealong for marking the workpiece. The saw guide of the instant invention may be readily utilized to first form a mark along which a workpiece is to be cut and to then guidingly support a circular saw for movement along the workpiece in a manner such that the cut formed by the circular saw coincides with the mark formed thereon.

The main object of this invention is to provide a novel and useful saw guide and more specifically to a saw guide including means by which the guide may be readily clampingly secured to any workpiece and utilized so as to form a mark on the workpiece extending along a line coinciding with a desired cut in the workpiece.

Another object of this invention, in accordance with the preceding object, is to provide a saw guide including means by which the guide may be readily adapted for use with portable circular saws of various types and sizes.

Still another object of this invention is to provide a clamp-type saw guide including means by which the guide may be readily clamped to various types and sizes of workpieces which are to be cut.

A final object of this invention to be specifically enumerated herein is to provide a clamp-type saw guide in accordance with the preceding objects which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, in which:

FIGURE 1 is a perspective view of the saw guide of the instant invention shown mounted upon a workpiece and the marking means of the guide being utilized to mark a line on the workpiece along which the latter is to be cut;

FIGURE 2 is a perspective view similar to that of FIGURE 1 but showing the workpiece being cut along the line previously formed on the workpiece;

FIGURE 3 is an enlarged fragmentary perspective view of one portion of the saw guide;

FIGURE 4 is a perspective view of the marking member supporting slide of the guide and with the marking member illustrated in an exploded position;

FIGURE 5 is a fragmentary vertical sectional view taken substantially upon the plane indicated by the section line 5—5 of FIGURE 1 and on somewhat of an enlarged scale;

FIGURE 6 is a fragmentary enlarged vertical sectional view taken substantially upon the plane indicated by the section line 6—6 of FIGURE 1; and FIGURE 7 is an enlarged fragmentary vertical sectional view taken substantially upon the plane indicated by the section line 7—7 of FIGURE 1.

Referring now more specifically to the drawings, the numeral 10 generally designates a typical workpiece such as a door panel. The clamp-type saw guide of the instant invention is generally referred to by the reference numeral 12 and includes an elongated guide member 14 including a pair of similar laterally directed terminal end portions 16 and 18. The laterally directed end portion 16 has a threaded bore 20 formed therethrough and an adjusting screw 22 is threadedly engaged with the bore 20 and includes an abutment 24 on one end and a handwheel 26 on the other end.

The end of the guide member 14 remote from the end portion 16 is provided with a plurality of longitudinally spaced bores 28 and it may be seen that a suitable fastener 30 is provided and may be secured through a selected one of the bores 28 for securing an angle abutment member 32 to the guide member 14. The angle abutment member includes a first flange 34 and an angulated abutment flange 36 which opposes the abutment member 24.

An elongated secondary guide 38 is provided and is swingably supported from the guide member 14 by means of a pair of generally parallel arm members 40 and 42 including eye portions 44 on one pair of corresponding ends which are pivotally secured to the end portions 16 and 18 in any convenient manner such as by fasteners 46. The opposite end portions of the secondary guide 38 are suitably apertured as at 48 and have the shank portions 50 of sliding clamp members 52 secured therethrough by means of threaded nuts 54.

The sliding clamp members 52 are provided with bores 56 through which the ends of the arm members 40 and 42 remote from the eye portions 44 are slidably received. However, upon the tightening of the threaded fasteners or wing nuts 54, the arm members 40 and 42 are clamped in adjusted positions. Therefore, it may be seen that the radius of curvature of the swinging movement of the secondary guide 38 may be adjusted by means of the slide clamp members 52.

A slide 58 is mounted on and slidable along the secondary guide 38 and includes a guideway 60 in which the secondary guide 38 is received. In addition, the slide 58 also includes a second guideway 62 in which a scribing or marking member 64 is secured by means of a suitable fastener 66. Further, the upper surface 68 of the slide 58 is provided with a detent recess 70 and it may be seen from FIGURE 3 of the drawings that one of the slide clamp members 52 includes a spring arm 72 whose free end portion 74 is receivable in the detent recess 70 for yieldingly retaining the slide 68 at the end of the secondary guide 38 adjacent the spring arm 72.

In operation, the guide member 14 is clamped to the workpiece 10 in a manner which is believed to be obvious and the secondary guide 38 may then be swung from the inoperative position illustrated in FIGURE 2 of the drawings to the operative position illustrated in FIGURE 1 of the drawings whereupon the slide 58 may be moved longitudinally thereof so as to mark the workpiece 10 as at 76. Then, the secondary guide 38 may again be swung to the inoperative position illustrated in FIGURE 2 of the drawings and the portable circular saw 78 may have one edge portion 80 of its base 82 engaged with the guide member 14 and moved longitudinally along the latter so as to form a cut 84 in the workpiece 10 coinciding with the mark 76. It will be noted that the distance between the guide member 14 and secondary guide 38 may be adjusted by adjustably positioning the slide clamp members 52 along the arm members 40 and 42 and therefore that the saw guide 12 may be readily adapted so as to be adapted to be utilized in conjunction with various types and sizes of circular saws.

The scribing member 64 is most beneficial in that the workpiece 10 may be cut or scribed thereby which cutting of the workpiece will enable the workpiece to be cut by the saw 78 without the latter leaving the portions of the scribed surface adjacent the saw cut splintered. Although the scribing member 64 is actually a cutter, it has been referred to herein as a scribing or marking member in that a marking member such as a pencil or the like could be used in lieu of the cutter 64 if it was not desired to cut the workpiece. Further, although the guide 12 has been described as being specifically adapted for use in conjunction with a saw, it is also to be noted that it could be utilized in conjunction with a router.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A saw guide comprising an elongated guide member adapted to overlie and be supported from a workpiece and including means operative to releasably retain said guide in adjusted position relative to said workpiece, said guide member including an elongated longitudinally extending tool guiding edge adapted to closely overlie said workpiece and guide a guiding portion of a saw body moved along said guide member and including a saw blade for cutting said workpiece along a line paralleling said guiding edge and spaced outwardly at one side of said guide member, an elongated secondary guide defining a work tool cut reference line defining member generally paralleling and of a length generally equal to the length of said guiding edge, means supporting said secondary guide from said guide member for swinging movement of said secondary guide about an axis generally paralleling said guide member from a first operative position spaced a predetermined distance outwardly of one side of and generally paralleling said guiding edge and adapted to closely overlie said workpiece and generally coincide with said line and a second inoperative position disposed to the side of an upstanding plane containing said tool guiding edge remote from said one side of said tool guiding edge, and a marking slide slidably supported on said secondary guide for movement therealong, said marking slide including marking means adapted to mark a reference line on said workpiece upon movement of said slide along said secondary guide over said workpiece.

2. The combination of claim 1 wherein said means supporting said secondary guide includes means for adjusting the radius of curvature of the swinging movement of said secondary guide relative to said guide member and thereby the spacing between said secondary guide and said guide member when said secondary guide is in said first operative position.

3. The combination of claim 1 wherein said means supporting said secondary guide includes a pair of arm members pivotally secured at one pair of corresponding end portions to opposite end portions of said guide member for rotation about said axis, said secondary guide extending between and secured to said arms for adjustable positioning therealong.

4. The combination of claim 3 wherein the opposite end portions of said secondary guide follower means slidably engaging the free ends of said arm members for longitudinal movement therealong and means operative to releasably secure said follower means in adjusted position along said arm members.

5. The combination of claim 1 wherein said means supporting said secondary guide includes a pair of arm members pivotally secured at one pair of corresponding end portions to opposite end portions of said guide member for rotation about said axis, said secondary guide extending between and secured to said arms for adjustable positioning therealong, said means supporting said secondary guide means for adjusting the radius of curvature of the swinging movement of said secondary guide relative to said guide member and thereby the spacing between said secondary guide and said guide member when said secondary guide is in said first operative position, said one abutment member including a threaded connection with said guide member.

6. The combination of claim 5 wherein the other abutment member and said guide member include coacting means operable to releasably secure said other abutment member in predetermined position spaced longitudinally of said guide member.

7. A clamp saw guide member comprising an elongated guide member adapted to extend transversely of a workpiece and including opposing and laterally outwardly positioned first and second opposite end abutment members, at least one of said abutment members being adjustable longitudinally of said guide member clampingly engaging said workpiece therebetween, an elongated secondary guide, means supporting said secondary guide from said guide member for swinging movement of said secondary guide about an axis generally paralleling said guide member from a first operative position disposed on one side of and generally paralleling said guide member and a second inoperative position disposed on the other side of said guide member, said means supporting said secondary guide including a pair of arm members pivotally secured at one pair of corresponding end portions to opposite end portions of said guide member for rotation about said axis, said secondary guide extending between and secured to the other pair of corresponding end portions of said arm members, the opposite end portions of said secondary guide including follower means slidably engaging the free ends of said arm members for longitudinal movement therealong and means operative to releasably secure said follower means in adjusted position along said arm members, and marking means comprising a slide slidable along said secondary guide and a scribing member mounted on said slide for adjustable positioning in a direction normal to the direction of movement of said slide along said secondary guide.

8. A saw guide comprising an elongated guide member adapted to overlie and be supported from a workpiece and including means operative to releasably retain said guide in adjusted position relative to said workpiece, said guide member including an elongated longitudinally extending tool guiding edge adapted to closely overlie said workpiece and guide a guiding portion of a saw body moved along said guide member and including a saw blade for cutting said workpiece along a line paralleling said guiding edge and spaced outwardly of one side of said guide member, an elongated secondary guide defining a work tool cut reference line defining member generally paralleling and of a length generally equal to the length of said guiding edge, means supporting said secondary guide member for shifting between a first operative position spaced a predetermined distance outwardly of one side of and generally paralleling said guiding edge and adapted to closely overlie said workpiece and generally coincide with said line and a second inoperative position disposed completely to the side of an upstanding plane containing said tool guiding edge remote from said one side of said tool guiding edge, and a marking slide slidably supported on said secondary guide for movement therealong, said marking slide including marking means adapted to mark a reference line on said workpiece upon movement of said slide along said secondary guide over said workpiece.

References Cited by the Examiner

UNITED STATES PATENTS

| | | | |
|---|---|---|---|
| 2,378,033 | 6/1945 | Pash | 33—108 |
| 2,651,333 | 9/1953 | Spinney | 143—6.43 |
| 2,823,709 | 2/1958 | Konieczka | 143—6.43 |
| 2,957,507 | 10/1960 | Vargo | 143—6.43 X |
| 2,976,899 | 3/1961 | Lane | 143—6.43 X |

FOREIGN PATENTS

| | | |
|---|---|---|
| 190,399 | 10/1907 | Germany. |
| 325,047 | 8/1919 | Germany. |

LEONARD FORMAN, *Primary Examiner.*

ISAAC LISANN, *Examiner.*

HARRY N. HAROIAN, *Assistant Examiner.*